Feb. 6, 1940.                H. H. TRIMMER                2,189,499
                       ENGINE CONTROL MECHANISM
                          Filed June 7, 1938              2 Sheets-Sheet 1
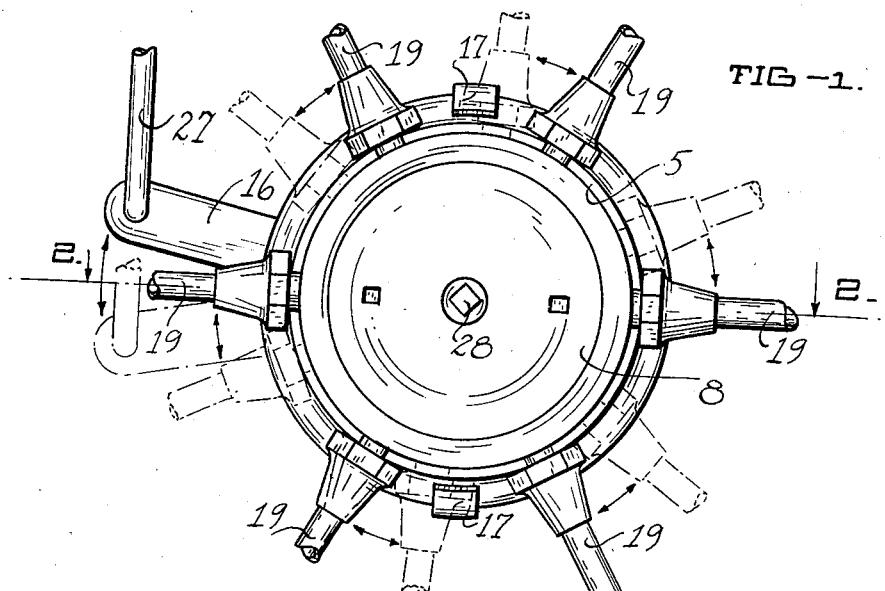
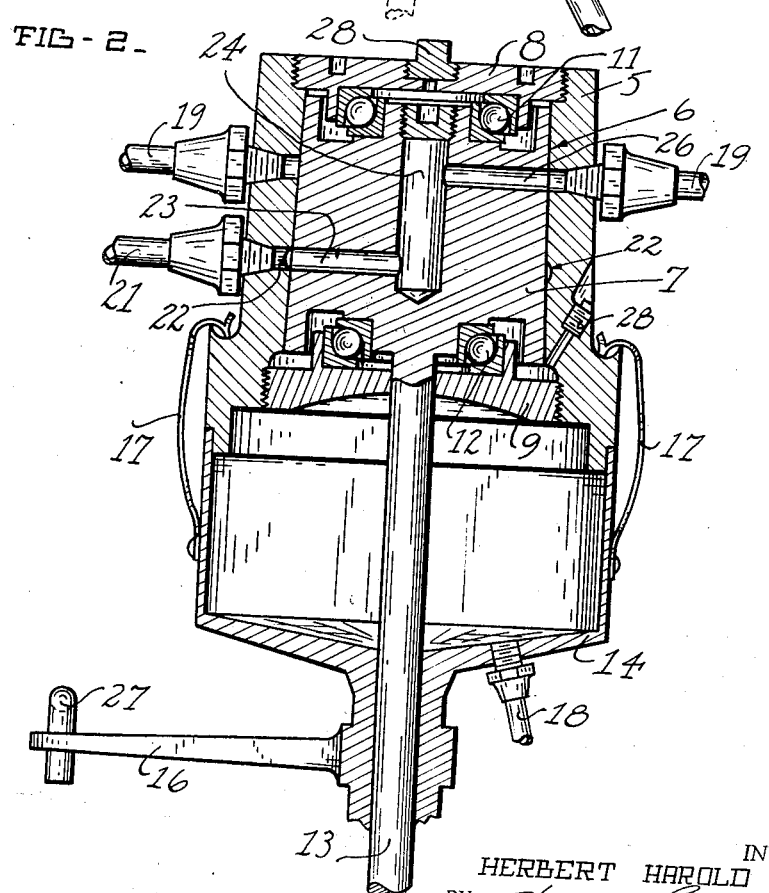
INVENTOR.
HERBERT HAROLD TRIMMER
BY
ATTORNEYS Feb. 6, 1940.                H. H. TRIMMER                2,189,499
                       ENGINE CONTROL MECHANISM
                         Filed June 7, 1938          2 Sheets-Sheet 2

INVENTOR.
HERBERT HAROLD TRIMMER
BY
ATTORNEYS.

Patented Feb. 6, 1940

2,189,499

UNITED STATES PATENT OFFICE 2,189,499

ENGINE CONTROL MECHANISM

Herbert Harold Trimmer, Van Nuys, Calif.

Application June 7, 1938, Serial No. 212,363

2 Claims. (Cl. 251—94)

This invention relates to improvements in engine control mechanism and has particular reference to a device for controlling the speed of an internal combustion engine of the Diesel type.

The principal object of the invention is to provide means for controlling Diesel engine speeds through the regulation of the amount of fuel admitted to the engine at each stroke.

A further object is to produce a device of this character which may be associated with any Diesel engine without altering its construction.

A further object is to produce a device of this character which is economical to manufacture and simple to install.

Other objects and advantages will be apparent during the course of the following description.

In the accompanying drawings forming a part of this specification and in which like numerals are employed to designate like parts throughout the same, Fig. 1 is a top plan view of my device;

Fig. 2 is a cross sectional view taken on the line 2—2 of Fig. 1; and

Figure 3:
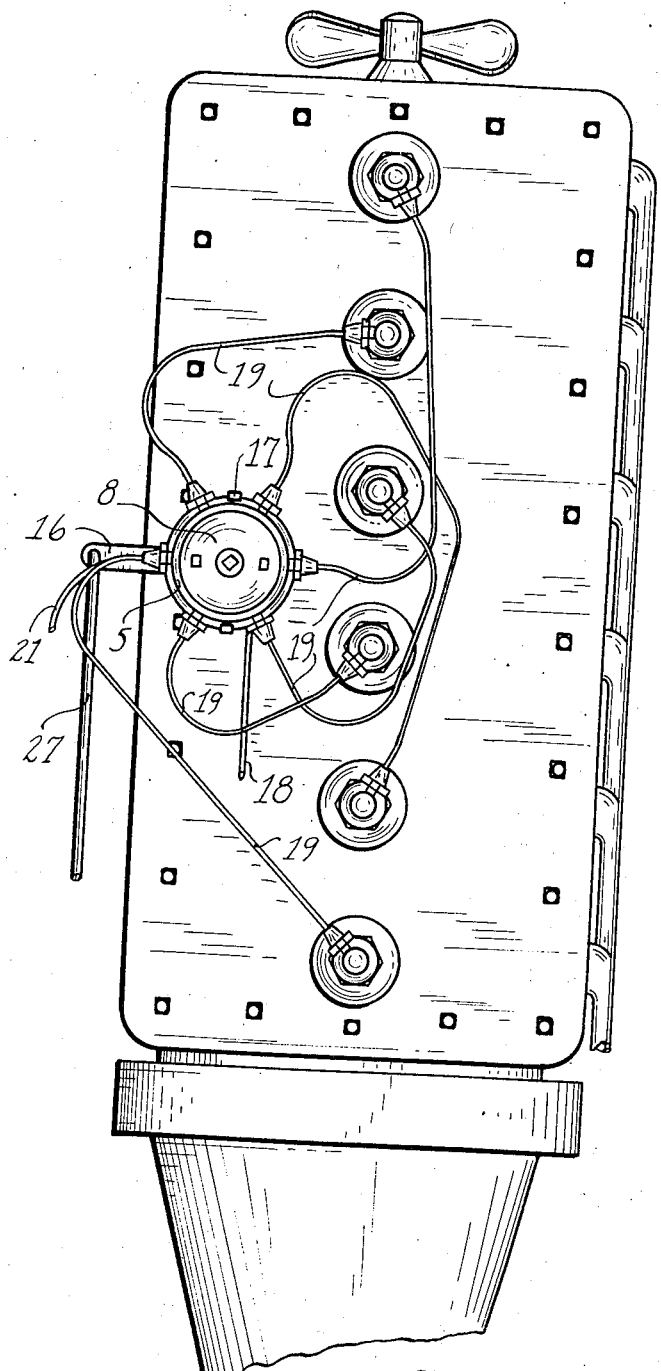
Fig. 3 is a top plan view of the device installed upon an engine.

In order to control the amount of fuel to a Diesel engine, it is necessary to control all of the cylinders simultaneously so that there will be an equal division of fuel therebetween.

I have, therefore, provided an element 5 which has a tapered bore 6 in which is rotatably mounted a valve plug 7. End pieces 8 and 9 serve to maintain roller bearings 11 and 12 in position, whereby the plug 7 may be easily and accurately rotated. The plug 7 is provided with a stem 13 which is connected to the engine in such a manner that the plug 7 will be rotated continuously while the engine is running. A cup 14 is mounted to rotate about the stem 13 through the medium of a lever 16, and is connected to the element 5 by snap hooks 17. A drain 18 serves to collect any leakage and return the same to the fuel supply. Pipes 19 connect the element 5 to the various cylinders and are spaced equally distant about the axis of the plug 7. A supply pipe 21 connects to a groove 22 formed on the inner wall of the element 5, and a port 23 connects the groove 22 and a central bore 24, which port in turn communicates with a passage 26 adapted to move in succession into communication with the pipes 19 as the plug 7 is rotated.

The result of this construction is that when the pull rod 27 moves the lever 16, the cup 14 and the attached element 5 will be rotated with respect to the position of the plug 7. Therefore, as the plug 7 is rotating, and assuming that the engine is running, the rotation of the element 5 will effect a change in the timing of the fuel discharge through the various cylinders.

In order to oil the bearings 11 and 12, I provide plugs 28 through which oil may be inserted.

It will be apparent from the above description that my device will accomplish all the objects set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, comprising a housing supported to oscillate and having a tapering bore therethrough, a valve plug mounted in said bore, caps screwed in said housing above and below the valve plug and having ball bearing engagement with the valve plug, a shaft carried by the valve plug and rotated by the engine, a plurality of pipes connected to the housing and communicating with the tapered bore, a fuel supply pipe connected to the housing and communicating with an annular groove in the tapered bore, a passage through the valve plug and having one end communicating with the annular groove and the opposite end adapted to communicate in succession with the plurality of pipes, and means for oscillating said housing around said valve plug.

2. In a device of the character described, comprising a housing supported to oscillate and having a tapering bore therethrough, a valve plug mounted in said bore, caps screwed in said housing above and below the valve plug and having ball bearing engagement with the valve plug, a shaft carried by the valve plug and rotated by the engine, a plurality of pipes connected to the housing and communicating with the tapered bore, a fuel supply pipe connected to the housing and communicating with an annular groove in the tapered bore, a passage through the valve plug and having one end communicating with the annular groove and the opposite end adapted to communicate in succession with the plurality of pipes, a cup surrounding the lower end of the housing and removably secured thereto, and means for oscillating the cup whereby the housing is oscillated around said valve plug.

HERBERT HAROLD TRIMMER.